United States Patent [19]
Marcu

[11] Patent Number: 5,193,462
[45] Date of Patent: Mar. 16, 1993

[54] TUBULAR ROLLER COASTER

[76] Inventor: Mihail I. Marcu, 4364 Bennett Road, Burlington, Ontario, Canada, L7L 1Y6

[21] Appl. No.: 587,757

[22] Filed: Sep. 24, 1990

[30] Foreign Application Priority Data

Sep. 26, 1989 [CA] Canada .................................. 613083

[51] Int. Cl.[5] ............................................. B61D 13/10
[52] U.S. Cl. .................................... 104/138.1; 104/63
[58] Field of Search ..................... 104/138.1, 138.2, 53, 104/55, 56, 60, 63, 64, 65, 66; 105/365

[56] References Cited

U.S. PATENT DOCUMENTS

| 3,565,011 | 2/1971 | Edwards | 104/138.1 |
|---|---|---|---|
| 3,734,428 | 5/1973 | Alexandrov et al. | 104/138.1 |
| 4,017,039 | 4/1977 | Carstens | 104/138.1 |
| 4,078,498 | 3/1978 | Futer | 104/138.1 |
| 4,113,202 | 9/1978 | Ueno | 104/138.1 |
| 4,458,602 | 7/1984 | Vandersteel | 104/138.1 |
| 4,821,647 | 4/1989 | Powell et al. | 104/138.1 |
| 4,940,368 | 7/1990 | Marcu | 104/138.1 |

Primary Examiner—Robert J. Oberleitner
Assistant Examiner—Mark T. Le

[57] ABSTRACT

The invention relates to a roller coaster system having a tubular track which includes linear and spiral guide track sections. The track sections are formed of circular cross-sectional members. The system includes at least a passenger vehicle for travelling in the tubular track. The vehicle includes a plurality of wheels at both ends of the vehicle for engaging the interior surface of the tubular track. The system includes a chain conveyor provided at an end of the tubular track for introducing the vehicle into the tubular track and a pneumatic propulsion unit, arranging adjacent to the chain conveyor, for propelling the vehicle after the vehicle has been introduced into the tubular track.

1 Claim, 1 Drawing Sheet

TUBULAR ROLLER COASTER

BACKGROUND OF THE INVENTION

This invention relates to a roller coaster based on wheeled containers moving inside of tubes.

PRIOR ART

The classic roller coaster is based on carriages moving on rails in open air. Their main disadvantage is the fact that time and again they generate serious accidents involving death of the passengers. It is the object of this invention to provide a roller coaster or/and tubular passenger transport with a high degree of safety eliminating the possibility of endangering human lives, solving forever the problem of accidents and expanding the kinetic sensations associated with such rides.

SUMMARY OF THE INVENTION

The proposed tubular roller coaster eliminates the above disadvantage by the fact that involves: a tubular guideway, wheeled vehicles able to roll/move inside of this guideway, propulsion units based on fans, blowers, compressors and introducing/launching facilities for the wheeled vehicles in the tubular guideway, the propulsion system could be either based on flap valves and booster relay system or could be based on forced injection system where the containers are pushed inside the tube and then taken by the pneumatic propulsion; the essence of the invention is the fact that the roller coaster route, usually a spiralled up and down track, is made of a tube and the vehicle is a wheeled capsule containing people.

BRIEF DESCRIPTION OF THE DRAWING

The above will be better understood by reading the following detailed description in conjunction with the attached drawing in which.

DETAILED DESCRIPTION OF THE DRAWING

Figure 1:
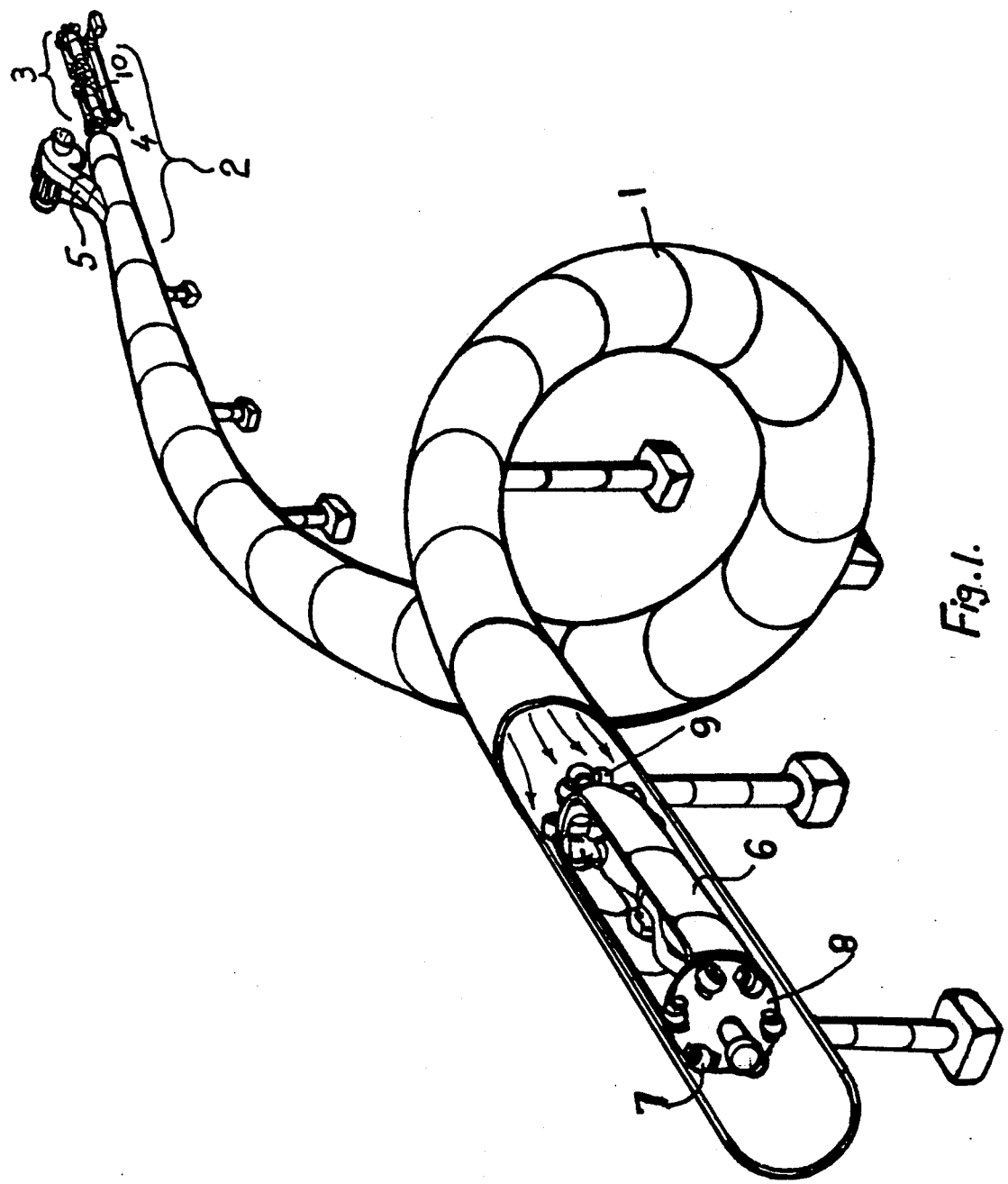
FIG. 1 is a perspective view of the tubular roller coaster.

In FIG. 1 is shown a tubular roller coaster, this being characterized by the fact that has: a tubular route 1 usually in form of a roller coaster route involving spiralling and ups and downs, this tubular route being possible to be made of transparent, partial transparent or opaque material or combination of these, at the beginning 2 of the roller coaster called the launching point being an injection mechanism 3 with a chain 4 which is introducing the containers into the tube, also at the beginning of the roller coaster being also a blower 5 which propels the wheeled containers/capsules 6 along the tubular route 1, these wheeled containers having accommodations/seats for passengers/riders and appropriate rollers 7 for rolling inside of the tube, preferably multiple rollers to be able to cope with spiralling/up and down evolutions in the roller coaster, these rollers being organized preferably in two rotary clusters—one in front 8 and one in the back 9, the said seats being able to maintain the vertical cruise position by appropriate shafts/articulations, in fact this kind of roller arrangement being known in the art of tubular transports. The way of operation of the above described tubular roller coaster is as follows: the wheeled capsules 10 with people inside comes over the chain 4 which pushes them inside of the tube 1 where the propulsion unit 5 is taking them pushing them by the force of compressed air along the tube, forcing them to roll & guide freely on the tubular guideway 1.

The embodiments of the invention in which an exclusive property or privilege is claimed are defined as follows:

1. A tubular roller coaster amusement system comprising:
    a guide means having at least a linear tubular section connected to at least a spiral up and down tubular section to form a continuous tubular track having a circular cross-sectional interior surface;
    at least a passenger vehicle being guided in said tubular track, said vehicle having a plurality of wheels at both ends of said vehicle for engaging the interior surface of the tubular track, all the wheels at each end of said vehicle being equally and symmetrically spaced in said circular cross-sectional interior surface;
    at least an introducing means including chain conveyor means provided at an end of the tubular track for introducing the vehicle into the tubular track; and
    at least a pneumatic propulsion unit arranging adjacent to said introducing means and including a blower means for propelling said vehicle after said vehicle has been introduced into the tubular track by said introducing means.

* * * * *